(No Model.)

J. W. ELLIS.
COMPOSITION OF MATTER FOR THE PRESERVATION AND INSULATION OF WIRES.

No. 321,956.      Patented July 14, 1885.

Witnesses:
John H. Corwin
Clinton S. Harris

Inventor
J. W. Ellis.
by his atty

UNITED STATES PATENT OFFICE.

JAMES W. ELLIS, OF BROOKLYN, NEW YORK, ASSIGNOR OF TWO-THIRDS TO JOSIAH W. PARKER, OF SAME PLACE, AND HENRY D. HARRIS, OF NEW YORK, N. Y.

COMPOSITION OF MATTER FOR THE PRESERVATION AND INSULATION OF WIRES.

SPECIFICATION forming part of Letters Patent No. 321,956, dated July 14, 1885.

Application filed March 9, 1885. (No specimens.)

*To all whom it may concern:*

Be it known that I, JAMES W. ELLIS, a citizen of the United States, residing at Brooklyn, in the county of Kings and State of New York, have invented a new and useful Composition of Matter for the Preservation and the Insulation of Wires Used for Telegraphy, &c., of which the following is a specification.

Figure 1:
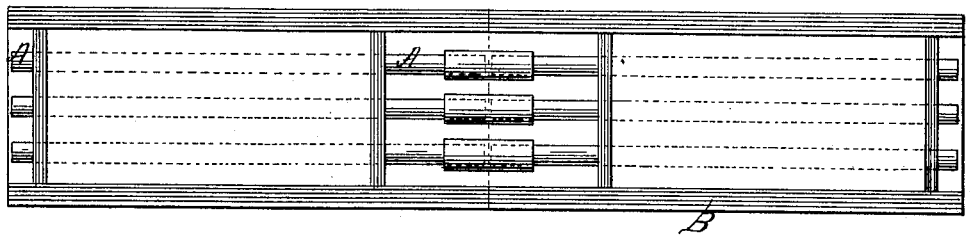
Figure 2:
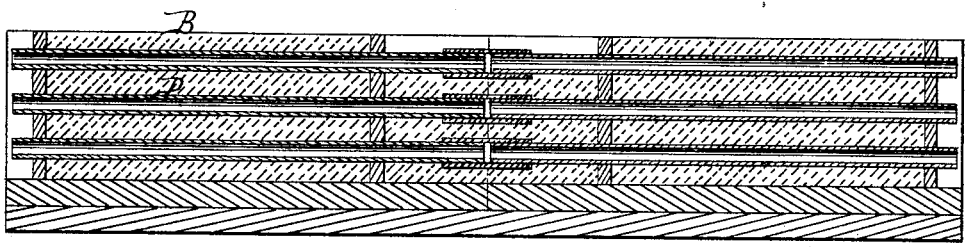
Figure 3:
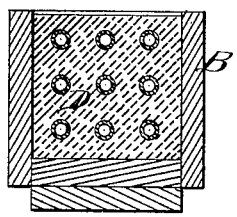

In the drawings accompanying this, Figure 1 is a plan view; Fig. 2, a vertical longitudinal section; Fig. 3, a cross-section.

I show telegraph-wires insulated by being passed through paper tubings, marked in the drawings A, and the box holding them B, and the composition of matter D; but I merely show this to illustrate the application of my composition.

My composition consists of the use of roofing-pitch in combination with other ingredients, as herein set forth.

In the manufacture of my composition I use roofing-pitch as the principal ingredient. This roofing-pitch is preferably that which is obtained from the distillation of coal-tar heated to such a temperature that it becomes a liquid, and all aniline colors are removed by the boiling. Roofing-pitch obtained from pine-tar and resin may be employed; but I think the former is preferable. Both are known in common as "roofing-pitch." I dissolve the roofing-pitch into a liquid by great heat, generally using about 200° Fahrenheit to do so. It may be found necessary in boiling the roofing-pitch, in order to prevent it from foaming over, to use a little sulphur of commerce—say, one-thirty-second part to a whole part of roofing-pitch. After the roofing-pitch is entirely dissolved and liquefied I add a one-thirty-second part of vulcanized rubber, for the purpose of rendering the roofing-pitch tenacious, and add one-sixteenth part of resin to render the substance brittle when it has become cold. If the sirup is too thick it may be thinned by petroleum or dead oil, using one-sixteenth part of either, or thereabout, according to the consistency required. To cause the composition thus formed to harden, one-thirty-second part of lime may be mixed with the composition. Now the mixture is poured into the box or other holder used for holding the paper tubes and wires, so as to completely surround and cover them, and as the composition quickly hardens a solid mass is soon formed, which is impervious to water, unaltered by cold and heat, and is a good protecting medium for insulation.

It will be necessary to keep stirring the roofing-pitch continually during the time that it is boiling, in order to prevent its burning and in order that the distillation may be the more complete.

I do not claim the use of roofing-pitch alone. I would not be able to use the same in covering my insulating-covers, as it would destroy them ere the substance became cool; nor do I claim the use of petroleum or mineral oil as essential.

What I claim, and desire to secure by Letters Patent, is—

As a coating or insulating covering for paper tubing used to cover telegraph, &c., wires, the combination of roofing-pitch with sulphur, resin, and lime, substantially as described, and for the purpose specified.

JAS. W. ELLIS.

Witnesses:
THOS. I. ELLIS,
CHAS. R. CLARKE.